United States Patent [19]

Kijima et al.

[11] Patent Number: 4,715,614
[45] Date of Patent: Dec. 29, 1987

[54] VEHICLE REAR-SUSPENSION SYSTEM

[75] Inventors: Takao Kijima; Fumitaka Ando, both of Hiroshima, Japan

[73] Assignee: Mazda Motor Corporation, Japan

[21] Appl. No.: 631,791

[22] Filed: Jul. 17, 1984

[30] Foreign Application Priority Data

Jul. 27, 1983 [JP] Japan ................. 58-138530

[51] Int. Cl.[4] ............... B60G 3/26; B60G 7/02
[52] U.S. Cl. ...................... 280/701; 267/248; 280/690
[58] Field of Search ............ 280/701, 689, 690, 688, 280/661; 180/73.3; 267/20 R

[56] References Cited

U.S. PATENT DOCUMENTS

| | | | |
|---|---|---|---|
| 3,163,440 | 12/1964 | Vail | 180/73.1 X |
| 3,333,654 | 8/1967 | Price-Stephens | 180/73.1 |
| 3,586,346 | 6/1971 | Sautter | 280/688 |
| 3,876,029 | 4/1975 | von der Ohe | 180/73.3 |
| 3,894,602 | 7/1975 | von der Ohe | 180/73.3 X |
| 4,444,415 | 4/1984 | von der Ohe | 280/701 |
| 4,462,609 | 7/1984 | von der Ohe | 280/690 |
| 4,474,389 | 10/1984 | von der Ohe | 280/701 |
| 4,526,400 | 7/1985 | Kijima et al. | 280/701 |
| 4,529,221 | 7/1985 | Kijima et al. | 280/701 |
| 4,529,222 | 7/1985 | Kijima et al. | 280/701 |
| 4,529,223 | 7/1985 | Maebayashi et al. | 280/701 |
| 4,530,514 | 7/1985 | Ito | 280/701 |
| 4,536,007 | 7/1985 | Kijima et al. | 280/701 |
| 4,537,420 | 8/1985 | Ito et al. | 280/661 |

FOREIGN PATENT DOCUMENTS

| | | | |
|---|---|---|---|
| 70025 | 1/1983 | European Pat. Off. | 280/701 |
| 2158931 | 5/1973 | Fed. Rep. of Germany | . |
| 2355954 | 11/1975 | Fed. Rep. of Germany | . |
| 2642939 | 3/1978 | Fed. Rep. of Germany | 280/690 |
| 3426942 | 2/1985 | Fed. Rep. of Germany | 280/701 |
| 5237649 | 9/1977 | Japan | . |
| 12814 | 1/1983 | Japan | 280/701 |

Primary Examiner—John J. Love
Assistant Examiner—Mitchell J. Hill
Attorney, Agent, or Firm—Gerald J. Ferguson, Jr.; Michael P. Hoffman; Michael J. Foycik, Jr.

[57] ABSTRACT

A vehicle rear-suspension system comprises a trailing arm one end of which is connected to the vehicle body by way of a resilient bushing for up-and-down pivotal movement, a wheel hub for supporting a rear wheel for rotation, a ball joint connecting the wheel hub to the trailing arm so as to permit pivotal movement of the wheel hub about a point relative to the trailing arm, and first and second resilient bushings which resiliently connect the wheel hub to the trailing arm, the ball joint and the first and second resilient bushings being arranged to cause the rear wheel to toe in against a force acting thereon. A first control link is fixed to said trailing arm at one end, and a second control link is connected for pivotal movement to the other end of the first control link at one end. The second control link is connected for pivotal movement to the vehicle body at the other end. The body side pivotal center of the second control link is offset from the pivotal axis of the trailing arm by a preset amount.

12 Claims, 6 Drawing Figures

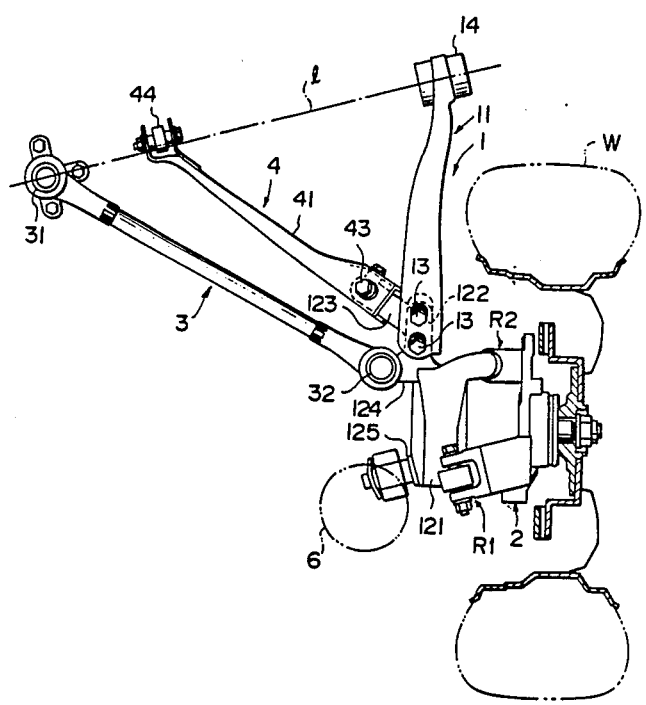

VEHICLE REAR-SUSPENSION SYSTEM

BACKGROUND OF THE INVENTION

1. Field of the Invention

This invention relates to a rear-suspension system for a vehicle, and more particularly to a trailing arm type rear-suspension system for a vehicle in which the rear wheels are arranged to toe in when forces such as a lateral force act on the wheels and in which the amount of chamber of the rear wheels is controlled upon rebound and/or bump.

2. Description of the Prior Art

As is well known, the rear-suspension system for a vehicle is desired to be arranged so that the rear wheels or the tires thereon are caused to toe in during travel, especially during cornering, in order to improve driving stability, driving comfort and the like. The centrifugal force exerted on the vehicle body during cornering acts on the rear-suspension as a lateral force. The tires are desired to counteract the lateral force with an increased resisting force in order to maximize the critical acceleration G in turning. The resisting force against the lateral force can be increased by causing the tires on the rear wheels to toe in to create a slip angle. By increasing the resisting force, the road gripping force of the rear tires can be improved and the tendency to understeer can be enhanced, whereby the driving stability of the vehicle is improved. When the accelerator pedal is pushed down during cornering, a driving force is exerted on the tires, while when the accelerator pedal is released during cornering, a braking force is exerted on the tires. The tires tend to toe out upon release of the accelerator pedal which has been depressed, while they tend to toe in upon depression of the accelerator pedal. This causes the tires to toe out and in during cornering, thereby adversely affecting the driving stability of the vehicle. Further, as the rubber bushings for improving riding comfort are disposed inside the treading point of the tires, the braking forces exerted on the tires when the brake pedal is depressed or an engine-brake effect occurs cause the tires to toe out and accordingly the driving stability is lowered. This means that the driving stability is lowered as the riding comfort becomes higher because the softer the rubber bushings are, the more comfortable the vehicle is to ride in. Therefore, there is a demand for a rear-suspension system which can cause the rear tires to toe in even when braking forces are exerted thereon through operation of the brake pedal or by the engine-brake effect. The ability of the rear-suspension system to always cause the tires to toe in (This ability will be referred to as "Toe-in ability" hereinbelow.) ensures a good driving stability during cornering. The toe-in ability of the rear-suspension is also desirable from the viewpoint of the stability of the vehicle during straight travel a a high speed which is particularly required in the case of a sports car. Actually, roads are not completely flat but inherently have bumps and recesses of various sizes which act on the tires as external disturbances in various directions. Further, winds impinging upon the vehicle body in various directions also act on the tires as external disturbances in various directions, and in particular, side winds act on the tires as lateral forces. If the rear-suspension can maintain its toe-in ability even when these external disturbances are exerted on the tires, an under-steer condition of the vehicle is always ensured, whereby the vehicle can always be stabilized. The external disturbances act as the lateral force, braking force or driving force described above irrespective of their origins.

Therefore, the rear-suspension system is desired to be able to keep its toe-in ability against all of the lateral force, braking force (due either to operation of the brake pedal or the engine-brake effect), and driving force. The lateral force is typically a thrust load produced during cornering and comprises a force acting on the treading point of the tires from outside to inside. The braking force due to operation of the brake pedal comprises a force acting on the treading point of the tires from front to rear while the braking force due to the engine-brake effect comprises a force acting on the wheel center of the tires from front to rear. The driving force comprises a force acting on the wheel center from rear to front. The four forces, the acting point thereof and the acting direction are tabulated in the following table.

| force | acting point | direction |
| --- | --- | --- |
| lateral force | treading point | outside to inside |
| brake force | treading point | front to rear |
| engine brake force | wheel center | front to rear |
| driving force | wheel center | rear to front |

In the above table and the following description, the braking force due to operation of the brake pedal and the same due to the engine-brake effect are referred to as "brake force" and "engine-brake force", respectively, in order to clearly distinguish them from each other.

There have been developed various rear-suspension systems which can maintain the toe-in ability against the lateral force produced during cornering. For example, there is disclosed in Japanese Patent Publication No. 52(1977)-37649 such a rear-suspension system which utilizes three rubber bushings of different hardnesses. In West German Pat. Nos. 2,158,931 and 2,355,954 there are disclosed such rear-suspension systems in which each wheel hub is supported by way of a vertical shaft and a spring. However, all of these are fairly complicated in structure. Further, the rear-suspension systems of the type mentioned above cannot keep their toe-in ability against all of the four forces described above, but only against the lateral force.

We have proposed, in our U.S. patent application Ser. No. 489,106, now U.S. Pat. No. 4,526,400, issued July 2, 1985, and West German Patent Application No. P3315352.3 based on our Japanese Patent Application No. 57(1982)-71936, a rear-suspension system which can keep its toe-in ability against the brake force, the engine-brake force and the driving force as well as the lateral force. In this rear-suspension system, a body side support member such as the semi-trailing arm of a semi-trailing type rear-suspension system, the strut of a strut type rear-suspension system or the like is connected to a wheel hub for a rear tire by way of a ball joint and a pair of rubber bushings which are properly positioned with respect to the wheel center. This rear-suspension system is advantageous in that the rear wheels can be caused to toe in against all the forces acting thereon. However, it is not satisfactory in that it cannot control camber of the rear wheels according to the running condition of the vehicle.

As is well known, it is desired that the camber of the rear wheels be controlled according to the running condition of the vehicle from the viewpoint of driving stability. For example, by keeping the amount of camber of the rear wheels at a proper negative value throughout bump during cornering, the driving stability during cornering can be improved. Further, when the rear tires hit upon a bump during straight travel at a high speed, or during rebound, the driving stability can be ensured by limiting the change in the amount of camber of the rear wheels.

SUMMARY OF THE INVENTION

In view of the foregoing observations and description, the primary object of the present invention is to provide an improved rear-suspension system in which the rear wheels can be caused to toe in against the forces acting thereon such as the lateral force and at the same time change in the amount of camber can be controlled during bump and rebound, thereby substantially improving driving stability of the vehicle.

Another object of the present invention is to provide a rear-suspension system which is simple in structure and can improve the driving stability of the vehicle especially during cornering.

Still another object of the present invention is to provide a rear-suspension system in which change in the amount of camber during straight travel is minimized, whereby stability of the vehicle during straight travel can be substantially improved.

In a vehicle rear-suspension system comprising a trailing arm one end of which is connected to the vehicle body by way of a resilient bushing for up-and-down pivotal movement, a wheel hub for supporting a rear wheel for rotation, a ball joint connecting the wheel hub to the trailing arm so as to permit pivotal movement of the wheel hub about a point relative to the trailing arm, and first and second resilient bushings which resiliently connect the wheel hub to the trailing arm, the ball joint and the first and second resilient bushings being arranged to cause the rear wheel to toe in against a force acting thereon, the rear-suspension system is characterized by a first control link fixed to said trailing arm at one end, and a second control link which is connected for pivotal movement to the other end of the first control link at one end and is connected for pivotal movement to the vehicle body at the other end, the body side pivotal center of the second control link being offset from the pivotal axis of the trailing arm by a preset amount.

DESCRIPTION OF THE PREFERRED EMBODIMENT

Figure 1:
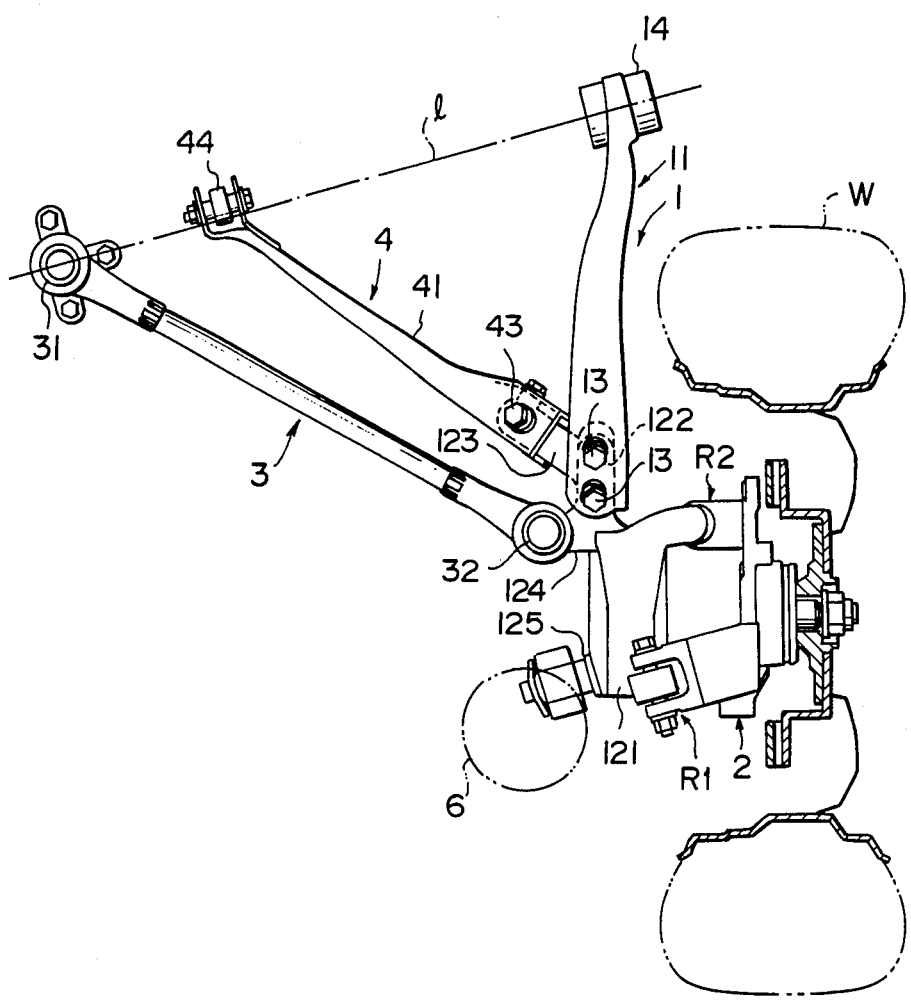
FIG. 1 is a plan view showing a part of a semi-trailing type rear-suspension system in accordance with an embodiment of the present invention.
Figure 2:
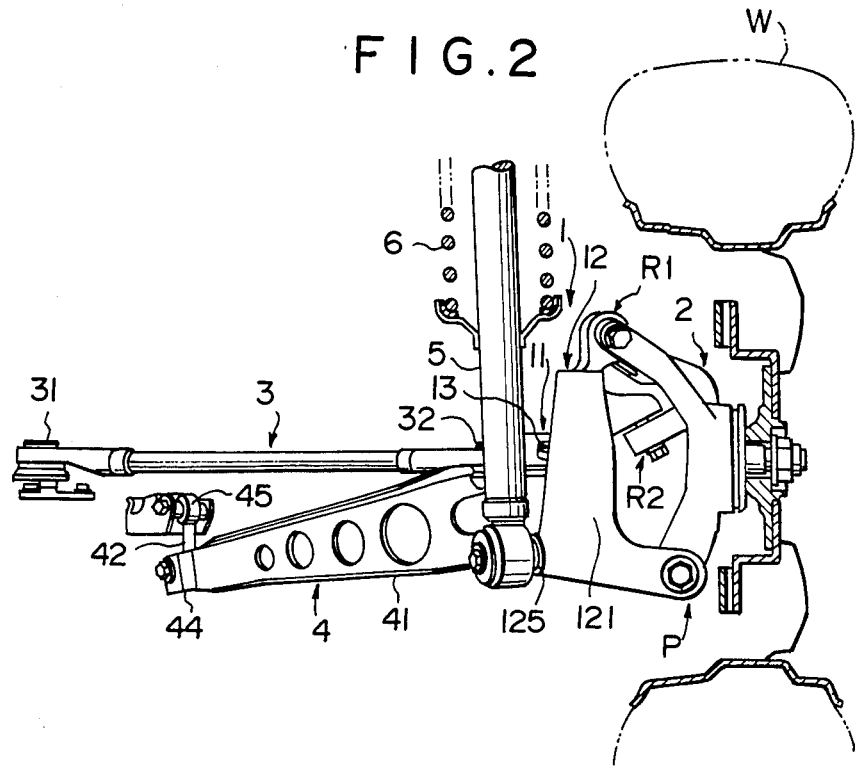
FIG. 2 is a side elevational view of FIG. 1.
Figure 3:
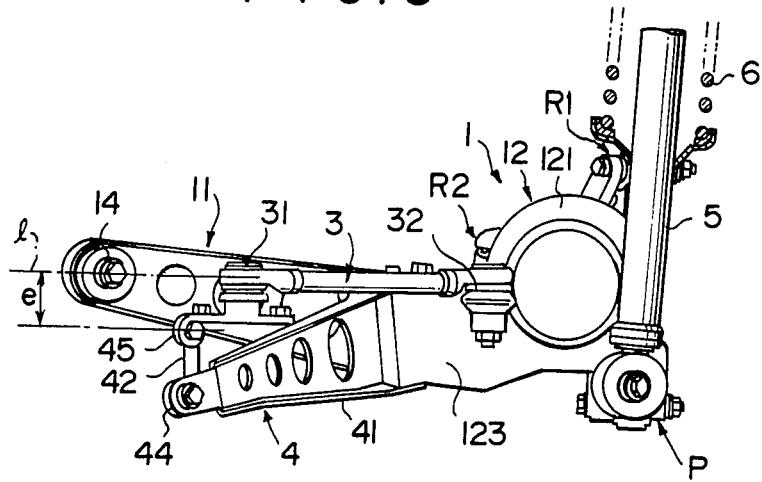
FIG. 3 is an end view of FIG. 1 as viewed from the rear the vehicle body.

FIGS. 1 to 3 show a semi-trailing arm type rear-suspension in accordance with an embodiment of the present invention. In FIGS. 1 to 3, the structure of the rear-suspension for the right rear wheel is illustrated. A semi-trailing arm 1 comprises a channel-like front member 11 and a cylindrical rear member 12 connected with each other, and extends substantially in the longitudinal direction of the vehicle body (not shown). The rear member 12 comprises a wheel hub support portion 121 which is cylindrical in shape and supports the wheel hub 2 for the right rear wheel W, a connecting portion 122 which projects forwardly from the wheel hub support portion 121 and is connected to the rear end portion of the front member 11, a control link mounting portion 123 which extends forwardly inwardly from the connecting portion 122 and to which a first control link 41 is fixed at one end as will be described later, and a lateral link mounting portion 124 which inwardly projects from the connecting portion 122 near the rear end of the control link mounting portion 123 and to which a lateral link 3 is connected as will be described later. The front member 11 is fixedly connected with the connecting portion 122 of the rear member 12 by bolts 13 at its rear end portion. The front end portion of the front member 11 forming the front end portion of the semi-trailing arm 1 extends forwardly and is mounted on the vehicle body by way of a resilient bushing 14 to pivot up and down.

Said wheel hub 2 is cylindrical in shape and supports the right rear wheel W for rotation. The wheel hub 2 is connected in floating connection to the semi-trailing arm 1 by way of a ball joint P which permits pivotal movements about a point, and first and second resilient bushings R1 and R2 such as rubber bushings each having a central axis substantially parallel to the longitudinal direction of the vehicle body.

Figure 4:
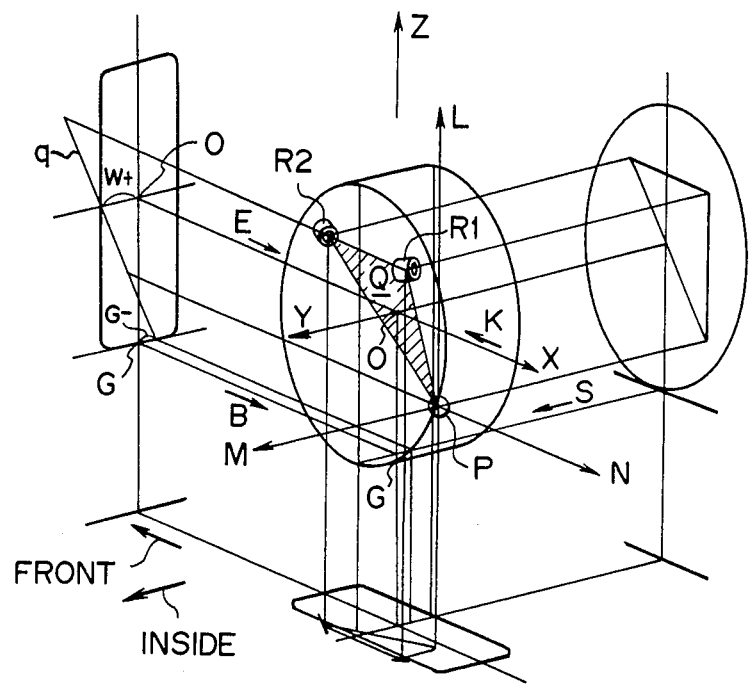
FIG. 4 is a schematic view for illustrating the principle of operation of the rear-suspension system of the present invention.

Now the arrangement of the ball joint P and the first and second resilient bushings R1 and R2 is described in detail with reference to FIG. 4. FIG. 4 is a combined schematic view for illustrating the principle of operation of the rear-suspension system of this embodiment. A schematic perspective view of the right rear tire of the vehicle as viewed from the left rear quarter is shown in the middle of FIG. 4, and projections from the rear, left side and above are positioned on the left and right sides of the perspective view and below it, respectively. A coordinate plane having its origin on the wheel center O of the wheel W, its abscissa on the horizontal line X passing through the wheel center O and its ordinate on the vertical line Z passing through the wheel center O is imagined as viewed from the left hand side of the vehicle body. The ball joint P is disposed in quadrant IV on the imaginary coordinate plane, that is, below the horizontal line X and on the rear side of the wheel center O. The first resilient bushing R1 is disposed in quadrant I, that is, above the horizontal line X and on the rear side of the wheel center O. The second resilient bushing R2 is disposed in quadrant II, that is, above the horizontal line X and on the front side of the wheel center O. The quadrants are numbered counterclockwise beginning from the upper right quadrant as viewed from the left hand side of the vehicle body. At the same time, the central axis of the first resilient bushing R1 is inclined outwardly toward the rear of the vehicle body and the central axis of the second resilient bushing R2 is inclined inwardly toward the rear of the vehicle body.

Again with reference to FIGS. 1 to 3, said lateral link 3 is mounted for pivotal movement on the vehicle body at one end by way of a ball joint 31 in a position on the inner side (with respect to the vehicle body) of the body side mounting point of the semi-trailing arm 1, i.e., the resilient bushing 14, and is connected for pivotal movements to the lateral link mounting portion 124 of the semi-trailing arm 1 by way of a ball joint 32, thereby ensuring lateral rigidity against the lateral force acting on the rear wheel W. The semi-trailing arm 1 and the lateral link 3 are associated with each other to support the semi-trailing arm 1 for pivotal movements with respect to the vehicle body. The line joining the body side mounting point of the semi-trailing arm 1, i.e., the resilient bushing 14, and the body side mounting point of the lateral link 3, i.e., the ball joint 31, that is, the line which forms the pivotal axis l of the semi-trailing arm 1 is inclined with respect to the longitudinal axis of the vehicle body by a predetermined angle.

A camber control link mechanism 4 is disposed between the semi-trailing arm 1 and the lateral link 3, and comprises said first control link 41 and a second control link 42. The first control link 41 is fixed to said control link mounting portion 123 of the semi-trailing arm 1 at one end by means of a bolt 43. The other end of the first control link 41 is directed inwardly downwardly toward the front of the vehicle body. The second control link 42 is disposed to extend vertically. The lower end of the second control link 42 is connected for pivotal movements to the said other end or the front end of the first control link 41 by way of a ball joint 44, and the upper end of the second control link 42 is connected for pivotal movements to the vehicle body by way of a ball joint 45. The second control link 42 is shorter than the first control link 41. The ball joint 45 on which the second control link 42 pivots is disposed in a position offset from said pivotal axis l of the semi-trailing arm 1 by a preset amount e (FIG. 3).

A vertically extending shock absorber 5 is connected at its lower end to a shock absorber support portion 125 which rearwardly projects from the wheel hub support portion 121 of the semi-trailing arm 1, and is connected to the vehicle body at its upper end. A coil spring 6 is disposed around the shock absorber 5.

As described above, the lateral force acts on the treading point G of the tire from outside to inside as indicated as S in FIG. 4, the brake force acts on the treading point G from front to rear as indicated at B, the engine-brake force acts on the wheel center W from front to rear as indicated at E, and the driving force acts on the wheel center W from rear to front as indicated at K.

In order to explain the principle of operation of the rear-suspension system of the present invention, a vertical axis L passing through the ball joint P, a horizontal axis M passing through the ball joint P in parallel to the axle, and a horizontal axis N passing through the ball joint P in the direction of the vehicle body are imagined. Then the position of the plane Q including the centers of the ball joint P and the resilient bushings R1 and R2 with respect to the wheel center O and the treading point G must be first discussed. The plane Q is represented by a line q in the projection from the rear in FIG. 4. In other words, the line q represents the intersectional line between the plane Q including the centers of the ball joint P and the resilient bushings R1 and R2, and the vertical plane including the central axis of the rear wheel.

The arrangement of the ball joint P and the resilient bushings R1 and R2 can be classified into four cases depending on the position of the plane Q including their centers or the line q with respect to the wheel center O and the treading point G. In the first case, the relevant plane Q or the line q is outwardly offset from the treading point G at the height of the treading point G (This condition is symbolized by G— in this specification and the drawings.) and at the same time is outwardly offset from the wheel center O at the height of the wheel center O (This condition is symbolized by W—, and the first case is symbolized by G—W—.). In the second case, the relevant plane Q is outwardly offset from the treading point G at the height thereof (G—) but is inwardly offset from the wheel center O at the height thereof (W+). That is, the second case is symbolized by G—W+. Similarly, the third and fourth cases are symbolized by G+W+ and G+W—, respectively.

When the relevant plane Q is outwardly offset from the treading point G at the height thereof and is inwardly offset from the wheel center O (G—W+) as shown in FIG. 4, the rear-suspension system of this embodiment operates in the following manner.

(a) When the lateral force S is exerted on the treading point G from outside to inside, the wheel W is displace clockwise about the horizontal axis N, and at the same time, there is generated a turning moment about the vertical axis L because the ball joint P is positioned rearward with respect to the treading point G on which the lateral force S acts. The turning moment about the axis L causes the first and second resilient bushings R1 and R2 to be resiliently deformed so that the mounting point of the second resilient bushing R2 is displaced inwardly by an amount larger than that of the first resilient bushing R1, thereby causing the rear wheel to toe in.

(b) When the brake force B is exerted on the treading point G from front to rear, the rear wheel W is clockwise displaced substantially about the vertical axis to toe in by virtue of the fact that the plane Q is outwardly offset from the treading point G at the height thereof (G—). At the same time, there is generated a turning moment to pivot the wheel W counterclockwise about the horizontal axis M, which tends to displace inwardly the first resilient bushing R1 and outwardly the second resilient bushing R2 thereby causing the rear wheel W to toe in. Accordingly, it is preferred that the first resilient bushing R1 be provided, at its front end, with a stopper in order to prevent counterclockwise rotational displacement of the rear wheel W about the axis M and to prevent the inward displacement of the first resilient bushing R1. The stopper will be described in detail later.

(c) When the engine-brake force E is exerted on the wheel center O from front to rear, the rear wheel W is displaced clockwise substantially about the horizontal axis M because the ball joint P is disposed downwardly offset from the wheel center O on which the engine-brake force E is exerted. When the wheel W is displaced clockwise about the axis M, the first resilient bushing R1 is displaced outwardly and the second resilient bushing R2 is displaced inwardly to cause the rear wheel W to toe in because the central axis of the first resilient bushing R1 is inclined rearwardly outwardly and the central axis of the second resilient bushing is inclined rearwardly inwardly as described above.

(d) When the driving force K is exerted on the wheel center O from rear to front, the rear wheel is counterclockwise displaced in the direction of toe-in about the vertical axis L by virtue of the fact that the plane Q is inwardly offset from the wheel center O at the height thereof. As in the case of the brake force, if the first resilient bushing R1 is displaced inwardly, the rear wheel W cannot be efficiently caused to toe in upon exertion of the driving force K thereon. Therefore, it is preferred that the first resilient bushing R1 be provided with a stopper as will be described in detail hereinafter.

When the relevant plane Q is inwardly offset both from the wheel center O and the treading point G at the respective heights (W+G+), the rear wheel W can be caused to toe in against the lateral force S, the engine-brake force E and the driving force K in the same manner as described in (a), (c) and (d), but is caused to toe out when the brake force B is exerted on the treading point G, which generates a clockwise turning moment about the vertical axis L as can be understood from the description above.

On the other hand, when the relevant plane Q is outwardly offset both from the wheel center O and the treading point G at their respective heights (G−W−), the first and second resilient bushings R1 and R2 are disposed so that the central axis of the first resilient bushing R1 disposed in quadrant I is inclined inwardly toward the rear of the vehicle body and the central axis of the second resilient bushing R2 disposed in quadrant II is inclined inwardly toward the rear of the vehicle body. In this case, the toe-in effect can be obtained in same manner as described in (a) against the lateral force S. Against the brake force B exerted on the treading point G from front to rear, the rear wheel W is displaced in the toe-in direction about the axes L and M by virtue of the fact that the plane Q is outwardly offset from the treading point G and the ball joint P is disposed above the treading point G. Against the engine brake force E, the wheel W is displaced in the toe-in direction substantially about the axis L. In order to cause the rear wheel W to toe in more efficiently, it is preferred that the first resilient bushing R1 be provided at its rear end with a stopper so that rearward displacement of the first resilient bushing R1 cannot be permitted. Against the driving force K exerted on the wheel center O from rear to front, the rear wheel W is displaced about the axis M in the counterclockwise direction and the counterclockwise displacement is converted into the displacement in the direction of toe-in by virtue of the guiding effect of the resilient bushings R1 and R2.

Thus in the rear-suspension system of this embodiment, the rear wheel can be caused to toe in against the lateral force S, and oversteering during cornering can be prevented, whereby stability of the vehicle can be improved. Further, the rear wheel W can be caused to toe in against the brake force B, the engine-brake force E and the driving force K as described above, and accordingly the driving stability of the vehicle can be further improved. Because the displacement to toe in is effected about the ball joint P, the toe-in movement is stabilized and ensured.

Figure 5A:
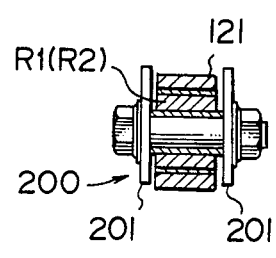
FIG. 5A is a cross-sectional view of a resilient bushing employed in the rear-suspension system of FIGS. 1 to 3.
Figure 5B:
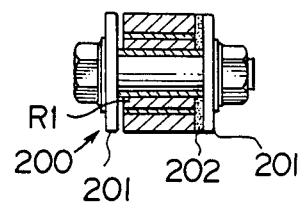
FIG. 5B is a cross-sectional view of the resilient bushing shown in FIG. 5A with a stopper provided on one end thereof.

Now referring to FIGS. 5A and 5B, the first and second resilient bushings R1 and R2 are described in detail. The resilient bushing R1 (R2) is fixed around mounting member 200 which is adapted to be connected to the wheel hub 2 and has a pair of spaced collars 201. Around the resilient bushing R1 is connected said wheel hub support portion 121. When the ends of the resilient bushing R1 are spaced from the respective collars 201 as shown in FIG. 5A, the bushing R1 permits displacement of the wheel hub 2 in its axial direction back and forth. By inserting a rigid stopper 202 between the front end of the bushing R1 and the corresponding collar 201 as shown in FIG. 5B, forward axial displacement of the resilient bushing R1 can be limited. Similarly, by inserting a rigid stopper between the rear end of the bushing R1 and the corresponding collar 201, rearward axial displacement of the bushing R1 can be limited.

During bump (including bump during cornering) and/or rebound of the rear wheel W, the rear wheel W supported on the wheel hub 2 vertically pivots with respect to the vehicle body under the guidance of both the semi-trailing arm 1 and the camber control link mechanism 4 comprising the first control link 41 fixed to the semi-trailing arm 1 at one end and the second control link 42 connected to the other end of the first control link 41. Because the body side pivotal center of the camber control link mechanism 4, i.e., the ball joint 45 is offset, by the preset amount e, from the pivotal axis l of the semi-trailing arm 1, the path along which the ball joint 44 (at which the first and second control links 41 and 42 are connected with each other) is to move when it pivots about the axis l differs from the path along which the ball joint 44 is to move when it pivots about the ball joint 45. By this difference in paths, change in the amount of camber during pivotal movements of the semi-trailing arm 1 is controlled. That is, the change in the amount of camber of the rear wheel W which would be obtained when the semi-trailing arm 1 pivots freely about the axis l is corrected by virtue of said difference in paths under resilient deformation of the resilient bushing 14 at which the semi-trailing arm 1 is mounted on the vehicle body, and the amount of correction depends upon the preset amount e by which the ball joint 45 is offset from the axis of pivotal movements of the semi-trailing arm 1.

Thus, upon bump during cornering, the camber is prevented from becoming positive or excessively negative, and is kept at an optimal value, whereby the driving stability during cornering is improved. For example, the camber is initially set at a negative optical value and is kept at the optimal value by arranging the system so that the amount of camber is corrected toward positive during bump or rebound. Further, when the rear tire hits a bump or rebounds during straight travel on rough roads, the change in the amount of camber of the rear wheel can be limited, thereby improving stability in straight travel. Further, by arranging the system so that the rear wheel W is tilted to have a negative camber taking into account the difference in amount between bump during cornering and bump during straight travel on rough roads, the amount of camber during cornering can be kept at a proper value and at the same time, the change in the amount of camber during straight travel on rough roads can be limited.

Further, in the rear-suspension system in accordance with the present invention, because the camber control upon bump and rebound is effected by way of resilient deformation of the resilient bushing 14 which is the sole mounting portion of the semi-trailing arm onto the vehicle body, the lateral rigidity against the lateral force being ensured by the lateral link 3, it can be accomplished easily and smoothly. At the same time, the lateral rigidity against the lateral force is increased, as compared with a semi-trailing arm mounted on the vehicle body at two points, by use of the lateral link 3, the driving stability and the running stability are further improved, and the vehicle body can be reduced in weight to that extent. In this connection, to arrange the camber control link mechanism 4 between the semi-trailing arm 1 and the lateral link 3 is advantageous in obtaining proper lateral rigidity by use of the lateral link 3.

Thus in the rear-suspension system of the present invention, the rear wheel can be effectively caused to toe in against various forces acting thereon, e.g., the lateral force, and at the same time, the camber of the rear wheel can be controlled according to the amount of bump and rebound. Therefore, for example, during cornering the rear wheel can toe in due to the lateral force and can have a negative camber due to bump, which substantially improves driving stability during cornering. During straight travel, by limiting the change in the amount of camber due to bump, rebound and the forces acting on the wheel to the minimum and maximizing the toe-in effect due to the forces acting on the wheel, the driving stability during straight travel can be greatly improved.

In the semi-trailing type rear-suspension system in which changes in toe-in and camber depend solely upon the inclination of the pivotal axis 1 of the semi-trailing arm 1 as in the embodiment described above, toe-in effect against the forces acting on the wheel can be obtained in addition to the camber control according to the amount of bump and rebound. This permits the position of the semi-trailing arm 1 and the inclination of the pivotal axis thereof to be freely selected not to interfere with the vehicle body, whereby the degree of freedom in designing rear-suspensions can be increased.

In the above embodiment, the first control link 41 of the camber control link mechanism 4 is fixedly connected to the semi-trailing arm 1 at the control link mounting portion 123 which is near the wheel hub support portion 121, and the lateral link 3 is connected to the semi-trailing arm 1 near the control link mounting portion 123. This arrangement is advantageous in that the part of the trailing arm to which torsion is imparted by the camber control link mechanism 4 and the lateral link 3 can be reduced in length, whereby the torsional rigidity can be improved and the system can be reduced in weight to the same extent. Further, in the above embodiment, the second control link 42 is arranged vertically and is shorter than the first control link 41. This permits the mounting point of the camber control link mechanism 4 to the vehicle body to be relatively high, which is advantageous in layout of the rear-suspension system and from the viewpoint of strength because the load placed on the second control link 42 is tension load.

The present invention is not limited to the above embodiment but various changes and modifications can be made. For example, the present invention can be applied also to a semi-trailing arm type rear-suspension in which the semi-trailing arm is connected to the vehicle body at two points, and full-trailing arm type rear-suspension.

Though, in the above embodiment, the ball joint P and the first and second resilient bushings R1 and R2 are respectively arranged in quadrants IV, I and II, the ball joint P may be disposed in any one of quadrant I, II and IV with the resilient bushings being respectively disposed in two of the remaining quadrants. However, the embodiment shown in FIG. 4 in which the ball joint P is in quadrant IV is advantageous in that substantially the same amount of force is exerted on the resilient bushings respectively disposed in quadrant I and II when the lateral force S or the brake force B is exerted on the rear wheel and accordingly durability of the resilient bushings can be increased, whereby strength of design is facilitated, behavior of the system in operation is stabilized, and the toe-in effect against the lateral force S is further ensured. When the ball joint P is disposed in quadrant I or II, substantially double the force exerted on one resilient bushing is exerted on the other resilient bushing.

What is claimed is:

1. A wheel suspension of a rear wheel of a vehicle, comprising a wheel supporting member having a trailing arm and a first control link, wherein said trailing arm at its end directed to a vehicle body is vertically pivotable about a pivotal axis, the trailing arm being connected to the vehicle body by means of a resilient bushing, and wherein the first control link at its end directed to the vehicle body is pivotably connected to one end of a second control link, said second control link, at its other end, being pivoted to the vehicle body at a body side pivotal center whereby the body side pivotal center of the second control link is downwardly offset from the pivotal axis of the trailing arm, a ball joint connecting the wheel supporting member to the trailing arm so as to permit pivotable movement of the wheel supporting member about a point relative to the trailing arm, and first and second resilient bushings which resiliently connect the wheel supporting member to the trailing arm, the ball joint and the first and second resilient bushings being arranged to cause the rear wheel to toe in against a force acting thereon.

2. A vehicle rear-suspension system as defined in claim 1 in which the end of the trailing arm connected to the vehicle body is connected by way of said resilient bushing at a single point and the trailing arm is further connected to the vehicle body by way of a lateral link connected to the trailing arm near a second end thereof.

3. A vehicle rear-suspension system as defined in claim 2 in which said trailing arm having a pivotable axis is arranged so that said pivotal axis thereof is inclined with respect to the longitudinal axis of the vehicle body.

4. A vehicle rear-suspension system as defined in claim 3 in which said lateral link is connected to the vehicle body for pivotal movement at one end thereof in a position inwardly disposed with respect to said single point at which the trailing arm is connected to the vehicle body, the other end of the lateral link being connected for pivotal movement to said second end of the trailing arm.

5. A vehicle rear-suspension system as defined in claim 4 in which said first and second control links are disposed between the trailing arm and the lateral link.

6. A vehicle rear-suspension system as defined in claim 5 in which said the other end of the first control link is directed inwardly downwardly toward the front of the vehicle body and the second control link is disposed to extend vertically, the second control link being shorter than the first control link.

7. A vehicle rear-suspension system as defined in claim 1 in which said trailing arm has a pivotal axis, and is arranged so that said pivotal axis thereof is inclined with respect to the longitudinal axis of the vehicle body.

8. A vehicle rear-suspension system as defined in claim 1, said wheel having a center, in which said ball joint and said first resilient bushing are disposed rearward of the wheel center and are vertically opposed to each other on opposite sides of a horizontal plane including the wheel center, and the second resilient bushing is disposed foreward of the wheel center.

9. A vehicle rear-suspension system as defined in claim 8 in which said trailing arm has a first end, and in which said first end of the trailing arm is connected to the vehicle body by way of said resilient bushing at a single point and the trailing arm is further connected to the vehicle body by way of a lateral link connected thereto near a second end thereof, the trailing arm being arranged so that the pivotal axis thereof is inclined with respect to the longitudinal axis of the vehicle body.

10. A vehicle rear-suspension system as defined in claim 9 in which said lateral link is connected to the vehicle body for pivotal movement at one end thereof and a position on an inner side, with respect to said vehicle body, of said single point at which a first end of the trailing arm is connected to the vehicle body and is connected to said second end of the trailing arm for pivotal movement at the other end, and said first and second control links are disposed between the trailing arm and the lateral link, said other end of the first control link being directed inwardly downwardly toward the front of the vehicle body, the second control link being shorter than the first control link and being disposed to extend vertically, where said second control link has a body side pivotal center and whereby said body side pivotal center of the second control link is downwardly offset from the pivotal axis of said trailing arm, the intersectional line between the plane including the centers of said ball joint and said first and second resilient bushings and the vertical plane including a central axis of the rear wheel being inwardly offset from the wheel center at the height thereof and outwardly offset from a treading point of the rear wheel at a height thereof, a central axis of the said first resilient bushing being outwardly directed toward the rear of the vehicle body and the central axis of said second bushing being inwardly directed toward the rear of the vehicle body.

11. A vehicle rear-suspension system as defined in claim 8 in which the intersectional line between an plane including centers of said ball joint and said first and second resilient bushings and a vertical plane including a central axis of the rear wheel is inwardly offset from the wheel center at the height thereof and outwardly offset from a treading point of the rear wheel at the height thereof, and a central axes of said first and second resilient bushing are respectively directed outwardly and inwardly toward the rear of the vehicle body.

12. A vehicle rear suspension system as defined in claim 1 including a lateral link, the ends of which are pivotably connected to the wheel supporting member and the vehicle body, respectively, by ball joints.

* * * * *